(12) United States Patent
Ugarov

(10) Patent No.: US 11,119,070 B2
(45) Date of Patent: *Sep. 14, 2021

(54) SYSTEMS AND METHODS FOR ION MOBILITY SEPARATION USING A LENS ARRAY

(71) Applicant: Thermo Finnigan LLC, San Jose, CA (US)

(72) Inventor: Mikhail V. Ugarov, San Jose, CA (US)

(73) Assignee: THERMO FINNIGAN LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/878,205

(22) Filed: May 19, 2020

(65) Prior Publication Data

US 2020/0278318 A1 Sep. 3, 2020

Related U.S. Application Data

(62) Division of application No. 16/024,462, filed on Jun. 29, 2018, now Pat. No. 10,663,428.

(51) Int. Cl.
*G01N 27/622* (2021.01)
*H01J 49/06* (2006.01)
(Continued)

(52) U.S. Cl.
CPC .......... *G01N 27/622* (2013.01); *H01J 49/063* (2013.01); *H01J 49/067* (2013.01);
(Continued)

(58) Field of Classification Search
CPC ... G01N 27/622; G01N 27/624; H01J 49/063; H01J 49/067; H01J 49/068; H01J 49/10; H01J 49/4215; H01J 49/426
See application file for complete search history.

(56) References Cited

U.S. PATENT DOCUMENTS 5,455,417 A 10/1995 Sacristan
5,847,386 A 12/1998 Thomson et al.
(Continued)

FOREIGN PATENT DOCUMENTS

CN 103460035 A 12/2013
EP 1923699 A1 5/2008
(Continued)

OTHER PUBLICATIONS

March et al., "Quadrupole Ion Trap Mass Spectrometry", Second Edition, Chapter 5, "Linear Quadrupole Ion Trap Mass Spectrometer", 2005, pp. 161-187.
(Continued)

*Primary Examiner* — Brooke Purinton
(74) *Attorney, Agent, or Firm* — David A. Schell

(57) ABSTRACT

A system for analyzing a sample includes a source; a mobility separator configured to separate ions based on a mobility in a gas; a plurality of ion channels; and a mass analyzer. The mobility separator includes a two-dimensional grid of electrodes spanning a passage between first and second walls. The first and second walls include an inlet aperture and a plurality of exit apertures, respectively. The two-dimensional grid of electrodes configured to generate an electric field within the passage. The plurality of ion channels arranged adjacent to the plurality of exit apertures. Movement of ions between the inlet aperture and the plurality of exit apertures are governed by the electric field and a gas flow through the passage between to the first and second walls such that the ions are sorted and directed to different channels based on their respective mobility.

9 Claims, 14 Drawing Sheets

(51) Int. Cl.
*H01J 49/10* (2006.01)
*G01N 27/624* (2021.01)

(52) U.S. Cl.
CPC ............ *H01J 49/068* (2013.01); *H01J 49/10* (2013.01); *G01N 27/624* (2013.01)

(56) References Cited

U.S. PATENT DOCUMENTS

| | | | |
|---|---|---|---|
| 5,936,242 | A | 8/1999 | De La Mora et al. |
| 7,196,327 | B2 | 3/2007 | Thomson et al. |
| 7,626,161 | B2 | 12/2009 | Labowsky et al. |
| 7,858,927 | B2 | 12/2010 | Thomson |
| 8,384,025 | B2 | 2/2013 | Sun et al. |
| 8,581,177 | B2 | 11/2013 | Kovtoun |
| 8,692,189 | B2 | 4/2014 | Makarov et al. |
| 8,766,176 | B2 | 7/2014 | Park et al. |
| 9,285,343 | B2 | 3/2016 | Wu et al. |
| 9,293,316 | B2 | 3/2016 | Kovtoun et al. |
| 9,508,538 | B2 | 11/2016 | Kovtoun |
| 9,607,817 | B1* | 3/2017 | Ugarov ............... H01J 49/0009 |
| 9,646,814 | B2 | 5/2017 | Brown et al. |
| 9,812,310 | B2 | 11/2017 | Kovtoun et al. |
| 10,663,428 | B2* | 5/2020 | Ugarov ............... H01J 49/068 |
| 2003/0146377 | A1 | 8/2003 | Miller et al. |
| 2005/0029449 | A1 | 2/2005 | Miller et al. |
| 2007/0272852 | A1 | 11/2007 | Miller et al. |
| 2008/0067349 | A1 | 3/2008 | Moskovets et al. |
| 2009/0140140 | A1 | 6/2009 | Raznikov et al. |
| 2011/0001044 | A1 | 1/2011 | Chou |
| 2011/0183431 | A1 | 7/2011 | Covey et al. |
| 2012/0256083 | A1 | 10/2012 | Kovtoun |
| 2012/0325024 | A1 | 12/2012 | Vidal-De-Miguel et al. |
| 2014/0326870 | A1 | 11/2014 | Makarov |
| 2014/0346339 | A1 | 11/2014 | Wu et al. |
| 2015/0287585 | A1 | 10/2015 | Kovtoun et al. |
| 2017/0076928 | A1 | 3/2017 | Ugarov |
| 2017/0076929 | A1* | 3/2017 | Giles ............... H01J 49/40 |
| 2017/0200594 | A1 | 7/2017 | Giles et al. |
| 2017/0256389 | A1* | 9/2017 | Grinfeld ............... H01J 49/423 |
| 2018/0366313 | A1* | 12/2018 | Hoyes ............... H01J 49/062 |
| 2019/0137447 | A1 | 5/2019 | Campbell |

FOREIGN PATENT DOCUMENTS

| | | |
|---|---|---|
| EP | 2126960 A2 | 12/2009 |
| EP | 3214638 A1 | 9/2017 |
| EP | 3239705 B1 | 9/2018 |
| GB | 2525275 A | 10/2015 |
| GB | 2530363 A | 3/2016 |
| WO | 2004/012231 A2 | 2/2004 |
| WO | 2005/065307 A2 | 7/2005 |
| WO | 2006/130474 A2 | 12/2006 |
| WO | 2008/094704 A2 | 8/2008 |
| WO | 2013143368 A1 | 10/2013 |

OTHER PUBLICATIONS

Watson et al., "Introduction to Mass Spectrometry—Instrumentation, Applications and Strategies for Data Interpretation", Fourth Edition, Chapter 2, "The Mass Spectrometer", (2007), pp. 53-172.
Wikipedia, "Ion-mobility spectrometry-massspectrometry", 2015, 4 pages
Cumeras et al., "Review on Ion Mobility Spectrometry. Part 1: current instrumentation", Analyst 2015, 140 (5), pp. 1376-1390.
Kanu et al., "Ion mobility-mass spectrometry", J. Mass Soectrom. 2008, 43 (1), pp. 1-22.
Loboda et al., "Novel Linac II electrode geometry for creating an axialfield in a multipole ion guide", European Journal of Mass Spectrometry, IM Publications 2000, vol. 6 (6), pp. 531-536.
Oller-Moreno et al., "Sliding window multi-curve resolution: Application to gas chromatography-ion mobility spectrometry", Sensors and Actuators B 217 (2015), pp. 13-21.
Rus, et al., "IMS—MS studies based on coupling a differential mobility analyzer (DMA) to commercial API—MS systems", Int. J.Mass.Spectrom., 2010, vol. 298 (1-3), pp. 30-40.
Shvartsburg, "Ion Mobility Spectrometry (IMS) and Mass Spectrometry (MS)", Encyclopedia of Spectroscopy and Spectrometry, 2017, pp. 314-321.

* cited by examiner

SYSTEMS AND METHODS FOR ION MOBILITY SEPARATION USING A LENS ARRAY

CROSS-REFERENCE TO RELATED APPLICATION

This application is a divisional under 35 U.S.C. § 121 and claims the priority benefit of co-pending U.S. patent application Ser. No. 16/024,462, filed Jun. 29, 2018, the disclosure of which is incorporated herein by reference in its entirety.

FIELD

The present disclosure generally relates to the field of mass spectrometry including systems and methods for ion separation.

INTRODUCTION

Filtering type mass spectrometry devices, such as quadrupole mass spectrometers, suffer from reduced efficiency (duty cycle) because they transmit ions of a single m/z ratio at a time while the rest are wasted. When performing an analysis of a complex sample, multiple analytes (N) can be targeted simultaneously by switching between ions and the duty cycle is limited to 1/N. While improvements can be made by only targeting transitions that correspond to ions eluting at a given moment, scheduling such experiments can be difficult when multiple ions elute at the same time or when retention times are unpredictable. Accumulating a broad range of ions in a trap and selectively ejecting them based on m/z to a quadrupole has the potential to avoid losing or missing ions while the quadrupole is analyzing only one m/z target at a time. However, the capacity of mass resolving ion traps is limited to between about $10^7$ to about $10^9$ ions per second, which is significantly below the brightness of existing ion sources, which can generate about $10^{10}$ ions per second or more. As such, the potential gains would be negated by the inability to handle the entire load as compared to a normal flow-through regime with the quadrupole cycling between m/z ratios. Other approaches for ion accumulation can make use of ion mobility principles where ions are separated in time/space by differences in their collision cross sections. These techniques can suffer from similar space charge capacity limitations as the entire population of ions is expected to be confined to a small space before being injected into the mass spectrometer for subsequent analysis.

From the foregoing it will be appreciated that a need exists for improved systems and methods for separating ions before sending them to a filtering type mass spectrometry device.

SUMMARY

In a first aspect, a system for analyzing a sample can include a source, a mobility separator, a plurality of ion channels, and a mass analyzer. The source can be configured to generate ions from constituent components of the sample. The mobility separator can be configured to separate ions received from the source based on the mobility in a gas. The mobility separator can include a first wall, a second wall, a passage between the first and second wall, and a two-dimensional grid of electrodes spanning the passageway. The first wall can include an inlet aperture for receiving ions from the source. The second wall can include a plurality of exit apertures. The two-dimensional grid of electrodes can be configured to generate an electric field within the passage. The mobility separator can provide a gas flow through the passage between to the first and second walls, wherein movement of ions between the inlet aperture and the plurality of exit apertures can be governed by the electric field and the gas flow such that the ions are sorted based on their respective mobility. The plurality of ion channels can be arranged adjacent to the plurality of exit apertures of the mobility separator such that ions from the mobility separator are directed to different channels according to their respective mobility. The mass analyzer can be configured to determine the mass-to-charge ratio of the ions.

In various embodiments of the first aspect, an angle between an electric field gradient and the gas flow can differ depending on the location within the passage.

In various embodiments of the first aspect, the ion channels can be selected from the group consisting of RF ion guides, ion traps, DC ion lenses, and a combination thereof.

In various embodiments of the first aspect, the system can further include a transfer guide configured to transport ions from the plurality of ion channels to a mass analyzer.

In various embodiments of the first aspect, the system can further include a lens array positioned between the mobility separator and the plurality of ion channels, the lens array configured to guide ions into respective ion channels.

In various embodiments of the first aspect, the system can further include a first electrode located adjacent to the second wall, and a second electrode located adjacent to the first electrode, the first and second electrodes each can include a plurality of openings corresponding to the plurality of exit apertures, the openings of the second electrode can be larger than the openings of the first electrode. In particular embodiments, the first and second electrodes can be configured to focus ions into the exit apertures. In particular embodiments, the system can further include third and fourth electrodes adjacent to the second electrode and having a plurality of openings corresponding to the plurality of exit apertures, the openings of the third and fourth electrodes can be larger than the openings of the second electrode. In particular embodiments, the first electrode and the fourth electrode can be configured to carry DC potentials and the second and third electrodes can be configured to carry RF potentials. In particular embodiments, the second and third electrodes can be configured to have RF potentials of opposite polarity.

In various embodiments of the first aspect, the system can further include a bypass configured to direct ions from the source to the mass analyzer without going through the mobility separator.

In various embodiments of the first aspect, one of the plurality of the exit apertures can be aligned with the inlet aperture and can be configured to receive ions in the absence of the gas flow.

In a second aspect, an ion mobility device for separating ions based on their ion mobility can include an ion mobility cell and a plurality of electrodes arranged in a two dimensional grid. The ion mobility cell can include a gas inlet and a gas outlet opposite the inlet along a first direction such that a gas flow introduced at the gas inlet would flow in a first direction to the gas outlet. The ion mobility cell can further include an ion entrance and a plurality of ion exit apertures opposite the ion entrance along a second direction and offset from the ion entrance and spaced apart from one another along the first direction. The plurality of electrodes can be configured to generate an electric field such that a path of an ion through the ion mobility cell is a function of the gas flow and the electric field such that ions exiting an ion exit aperture have a range of ion mobilities that is different from a range of ion mobilities for ions entering an adjacent ion exit aperture.

In various embodiments of the second aspect, an angle between an electric field gradient and the gas flow can differ depending on the location within the passage.

In various embodiments of the second aspect, the ion mobility device can further include a lens array positioned adjacent to plurality of ion exit apertures, the lens array can be configured to guide ions into respective ion exit apertures.

In various embodiments of the second aspect, the lens array can include an inner electrode, an outer electrode, and one or more middle electrodes between the inner electrode and the outer electrode. In particular embodiments, an opening size of the electrodes can increase from the inner electrode to the outer electrode, and the opening size of the inner electrode can be greater than a size of the ion exit apertures. In particular embodiments, the inner electrode and the outer electrode can be configured to carry DC potentials and the middle electrodes can be configured to carry RF potentials of alternating polarity. In particular embodiments, one of the plurality of ion exit apertures can be aligned with the ion entrance and configured to receive ions in the absence of the gas flow.

In a third aspect, an ion mobility device for separating ions based on their ion mobility can include an ion mobility cell and a plurality of electrodes. The ion mobility cell can have a gas inlet and a gas outlet opposite the inlet along a first direction such that a gas flow introduced at the gas inlet would flow in a first direction to the gas outlet. The ion mobility cell can have an ion entrance and a plurality of ion exit apertures opposite the ion entrance along a second direction and offset from the ion entrance and spaced apart from one another along the first direction. The plurality of electrodes can be configured to generate an electric field such that a path of an ion through the ion mobility cell is a function of the gas flow and the electric field such that ions exiting an ion exit aperture have a range of ion mobilities that is different from a range of ion mobilities for ions entering an adjacent ion exit aperture, wherein an angle between an electric field gradient and the gas flow can change depending on the location within the ion mobility cell.

In various embodiments of the third aspect, the electric field can be generated by a two-dimensional grid of electrodes.

In various embodiments of the third aspect, the electric field is generated by an array of curved electrode strips.

In various embodiments of the third aspect, one of the plurality of ion exit apertures is aligned with the ion entrance and configured to receive ions in the absence of the gas flow.

In a fourth aspect, a method for identifying components of a sample can include providing a sample to an ion source and generating a plurality of ions from constituent components of the sample; separating a first set of ions of the plurality of ions based on ion mobility using a ion mobility separator having a gas flow in a first direction and an electric field in a first configuration such that movement of the ions of the first set is governed by the electric field in the first configuration and the gas flow; directing the ions into a plurality of ion channels such that ions entering an individual ion channel have a range of ion mobilities that is different from a range of ion mobilities for ions entering an adjacent ion channel; directing ions from individual ion channels into a mass analyzer; changing the electric field to a second configuration; separating a second set of ions of the plurality of ions based on ion mobility using the mobility separator such that movement of the ions of the first set is governed by the electric field in the second configuration and the gas flow; directing the ions into the plurality of ion channels; directing ions from individual ion channels into a mass analyzer; and determining the mass-to-charge ratio of the first and second sets of ions using the mass analyzer.

In various embodiments of the fourth aspect, the electric field is generated by a two-dimensional grid of electrodes.

In various embodiments of the fourth aspect, in the first configuration or the second configuration an angle between an electric field gradient and the gas flow differs depending on the location within the passage.

In various embodiments of the fourth aspect, a separation of the first set of ions has a different degree of separation than a separation of the second set of ions.

In various embodiments of the fourth aspect, a separation of the first set of ions has a different range of ion mobilities than a separation of the second set of ions.

In a fifth aspect, an ion mobility device for separating ions based on their ion mobility can include an ion mobility cell, a plurality of electrodes, and a lens array. The ion mobility cell can have a gas inlet and a gas outlet opposite the inlet along a first direction such that a gas flow introduced at the gas inlet would flow in a first direction to the gas outlet, an ion entrance, and a plurality of ion exit apertures opposite the ion entrance along a second direction and offset from the ion entrance and spaced apart from one another along the first direction. The plurality of electrodes can be configured to generate an electric field gradient in the second direction such that ions entering the ion mobility cell flow in the first direction with the gas and drift according to their mobility in the gas in the second direction such that ions exiting an ion exit aperture have a range of ion mobilities that is different from a range of ion mobilities for ions entering an adjacent ion exit aperture. The lens array can be positioned adjacent to plurality of ion exit apertures and configured to guide ions into respective ion exit apertures. The lens array can include at least one electrode, wherein an opening size of the electrode can be greater than an opening size of the ion exit apertures.

In various embodiments of the fifth aspect, an angle between an electric field gradient and the gas flow can differ depending on the location within the passage.

In various embodiments of the fifth aspect, the at least one electrode can include an inner electrode, an outer electrode, and one or more middle electrodes between the inner electrode and the outer electrode, wherein the opening size of the electrodes increases from the inner electrode to the outer electrode In particular embodiments, the inner electrode and the outer electrode can be configured to carry DC potentials and the middle electrodes can be configured to carry RF potentials of alternating polarity.

In particular embodiments, the DC and RF potentials can be configured to maximize transmission of ions.

In particular embodiments, the DC and RF potentials can be configured to maximize separation between ranges of ion mobilities.

In a sixth aspect, a method for identifying components of a sample can include providing a sample to an ion source and generating a plurality of ions from constituent components of the sample; separating a first set of ions of the plurality of ions based on ion mobility using a ion mobility separator having a gas flow in a first direction and an electric field such that ion paths of the ions of the first set from a ion entrance to a plurality of ion exit apertures are governed by the electric field and the gas flow; directing the ions into a plurality of ion channels using lens array such that ions entering an individual ion channel have a range of ion mobilities that is different from a range of ion mobilities for ions entering an adjacent ion channel, the lens array having a first set of potentials; directing ions from individual ion channels into a mass analyzer; changing the lens array to a second set of potentials; separating a second set of ions of the plurality of ions based on ion mobility using the mobility separator; directing the ions into the plurality of ion channels using lens array with the second set of potentials; directing ions from individual ion channels into a mass analyzer; and determining the mass-to-charge ratio of the first and second sets of ions using the mass analyzer.

In various embodiments of the fifth aspect, the lens array can include at least one electrode with a plurality of openings aligned with the ion exit apertures.

In various embodiments of the fifth aspect, the lens array can include an inner electrode, an outer electrode, and one or more middle electrodes between the inner electrode and the outer electrode. In particular embodiments, wherein an opening size of the electrodes can increase from the inner electrode to the outer electrode and the opening size of the inner electrode can be greater than an opening size of the ion exit apertures.

In various embodiments of the fifth aspect, a transmission of the first set of ions can be greater than a transmission of the second set of ions.

In various embodiments of the fifth aspect, a separation of the first set of ions can be greater than a separation of the second set of ions.

DRAWINGS

For a more complete understanding of the principles disclosed herein, and the advantages thereof, reference is now made to the following descriptions taken in conjunction with the accompanying drawings, in which.

Figures 5A, 5B, 5C:
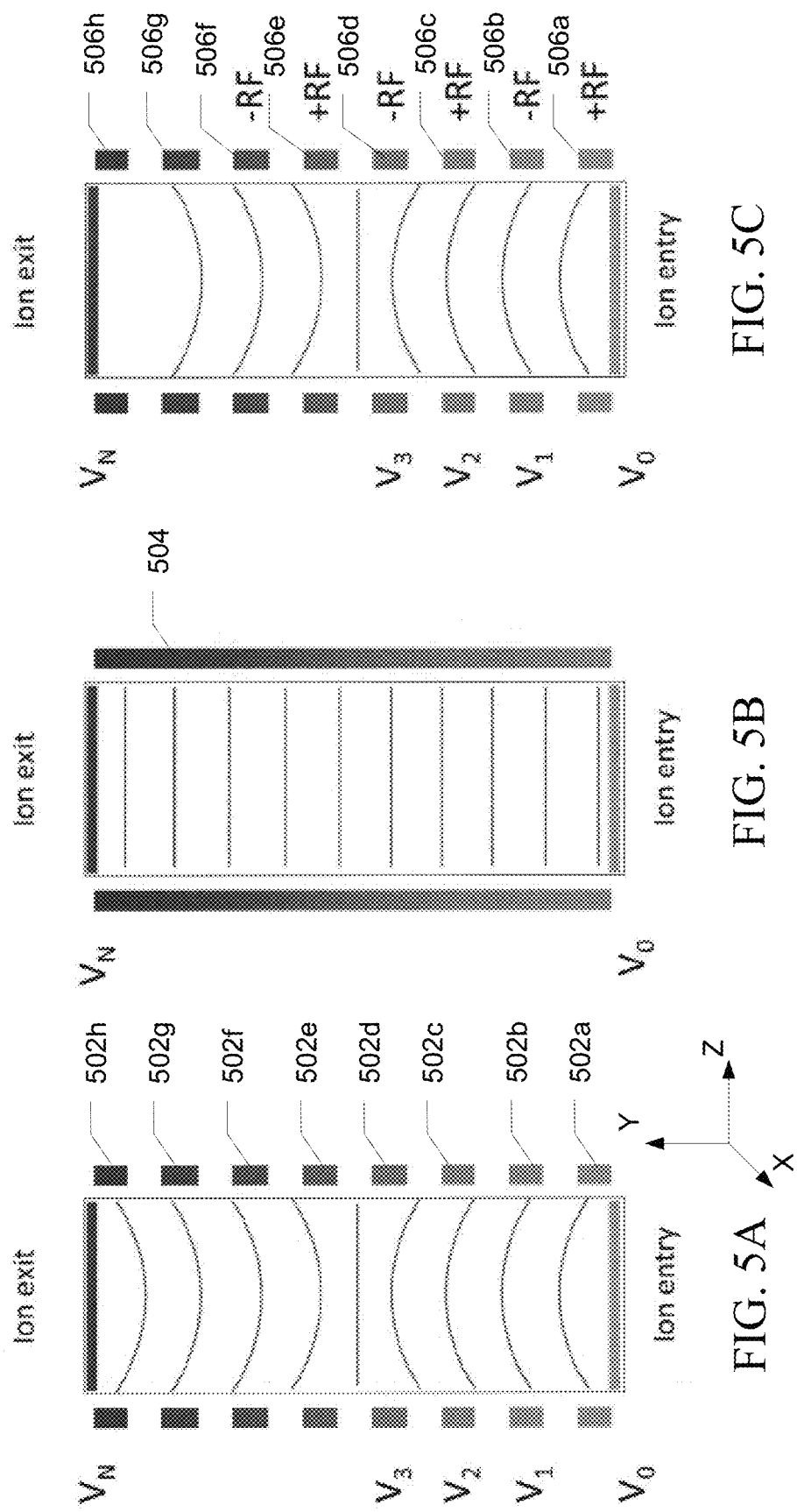

FIGS. 5A, 5B, and 5C are exemplary electrode arrangements for creating an electrical field gradient across an ion mobility separator, in accordance with various embodiments.

Figure 6A:
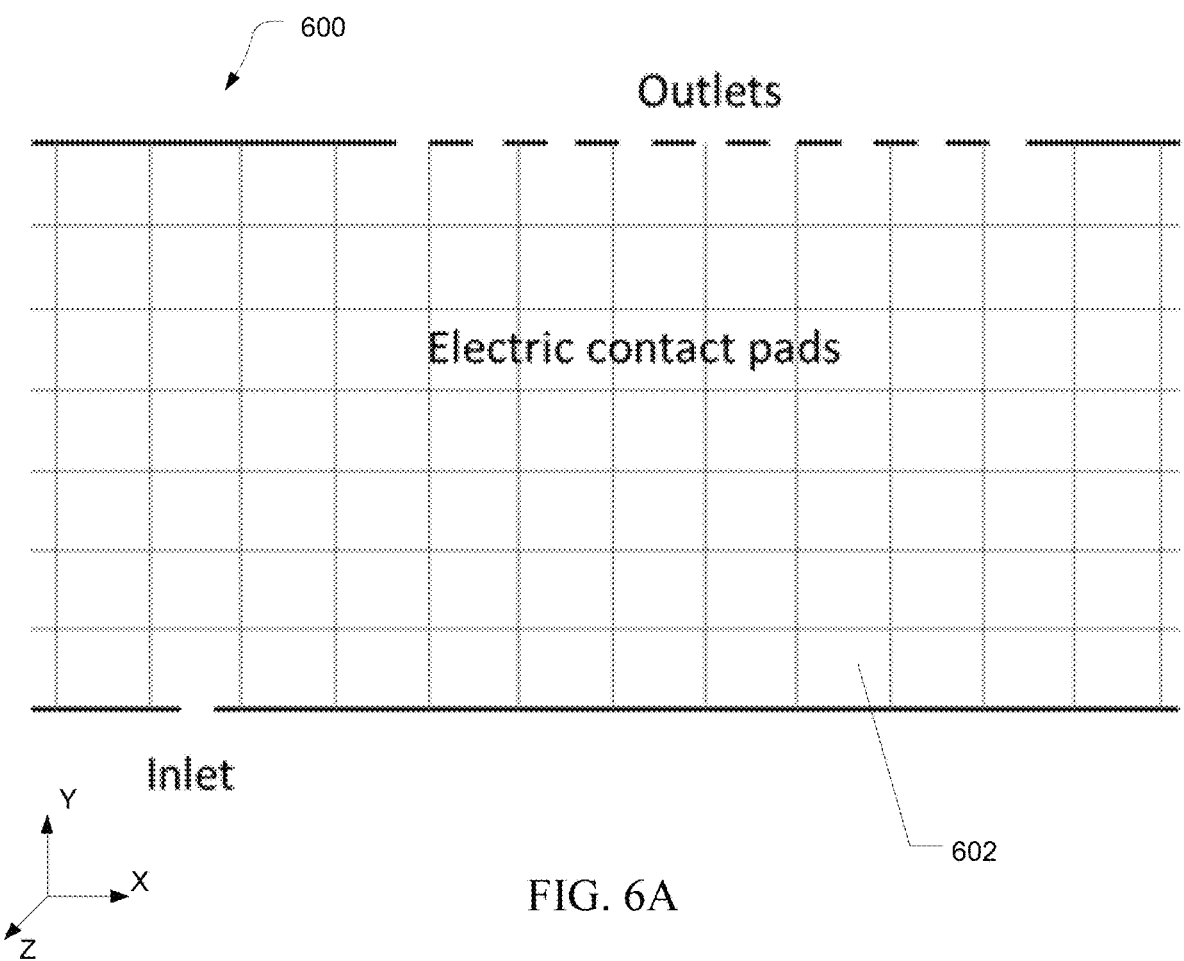

FIG. 6A is an exemplary grid electrode arrangement for creating dynamic electrical field gradients across an ion mobility separator, in accordance with various embodiments.

Figure 6B:
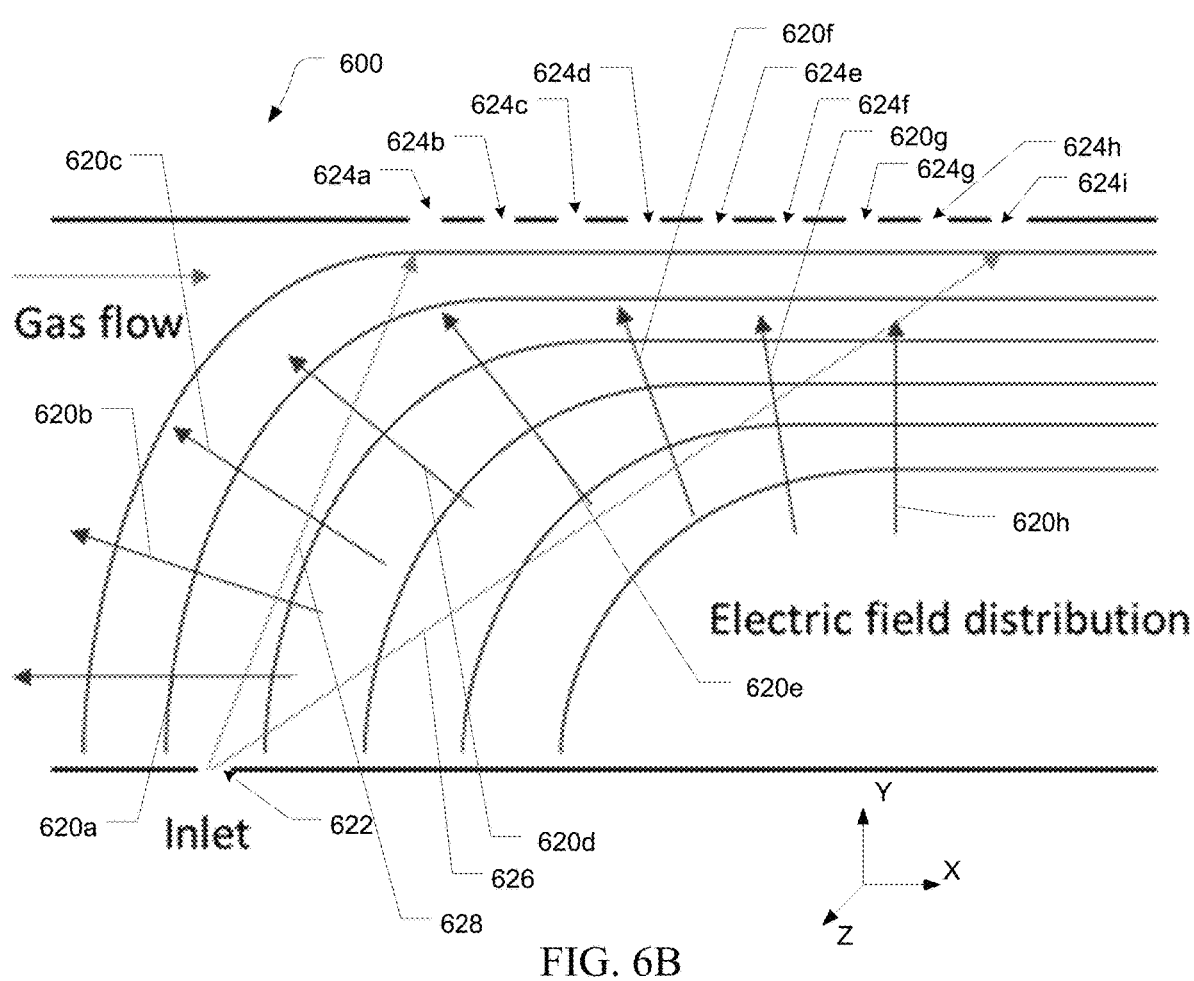

FIG. 6B is an exemplary electric field gradient, in accordance with various embodiments.

FIGS. 7A, 7B, 7C, and 7D are illustrations showing an exemplary ion optical arrangement for guiding ions through ion exit orifices of an ion mobility separator, in accordance with various embodiments.

Figure 8:
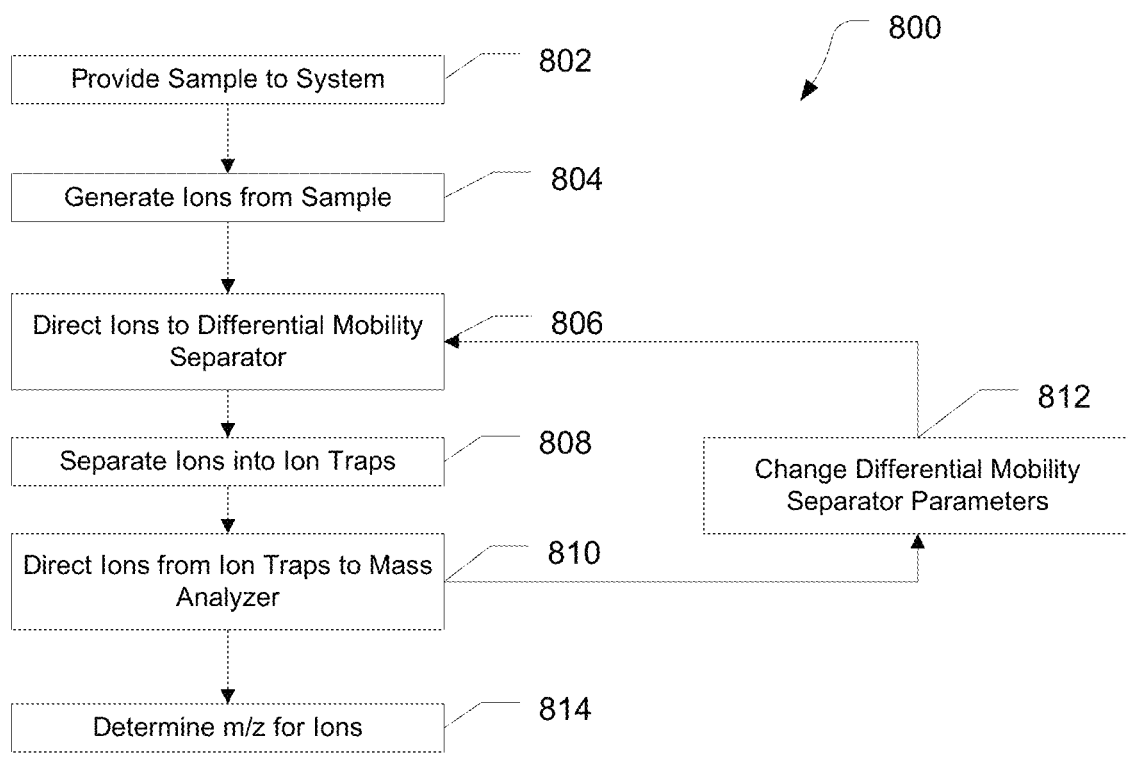

FIG. 8 is a flow diagram illustrating an exemplary method for separating ions, in accordance with various embodiments.

Figure 9A:
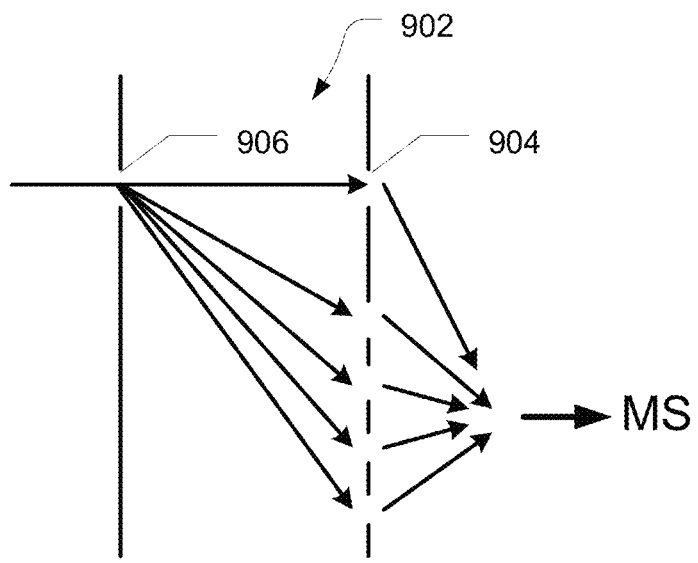
Figure 9B:
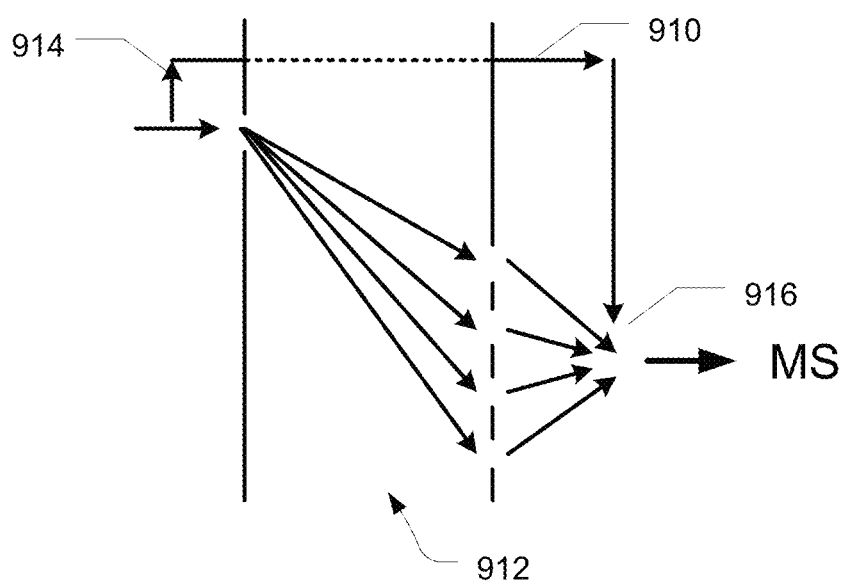

FIGS. 9A and 9B are diagrams illustrating exemplary arrangements for bypassing the ion mobility separator, in accordance with various embodiments.

Figure 10A:
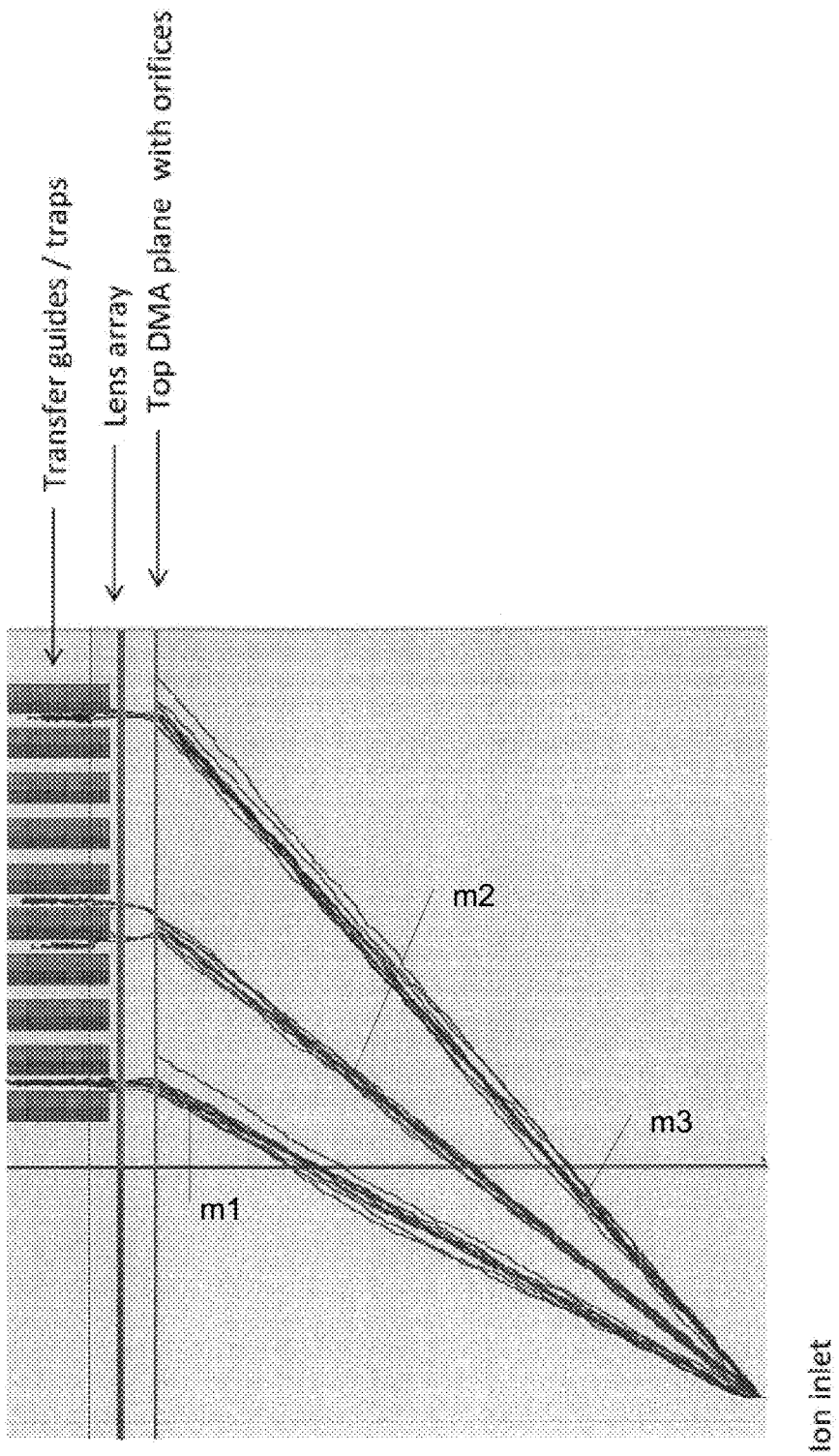
Figure 10B:
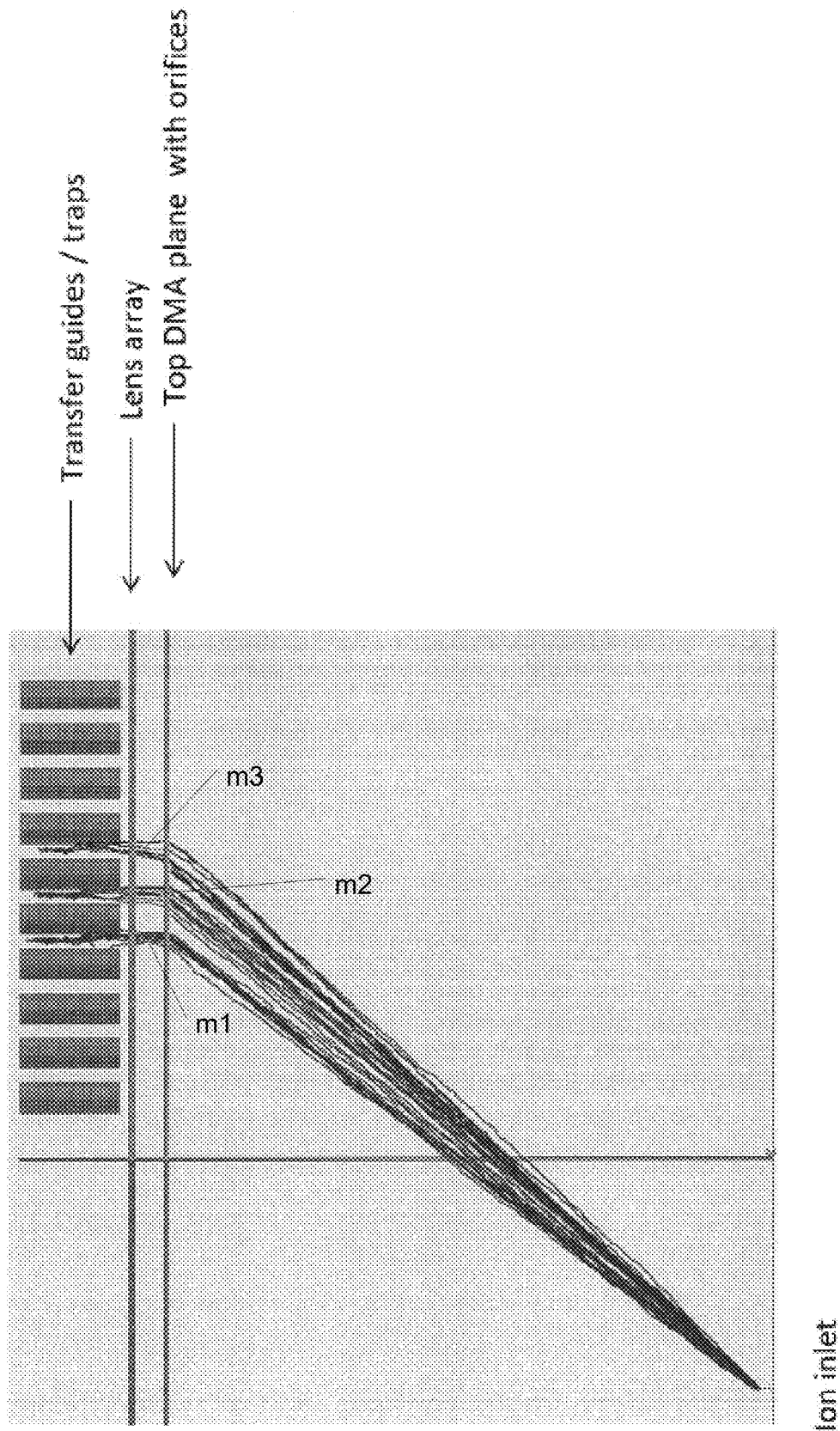
Figure 10C:
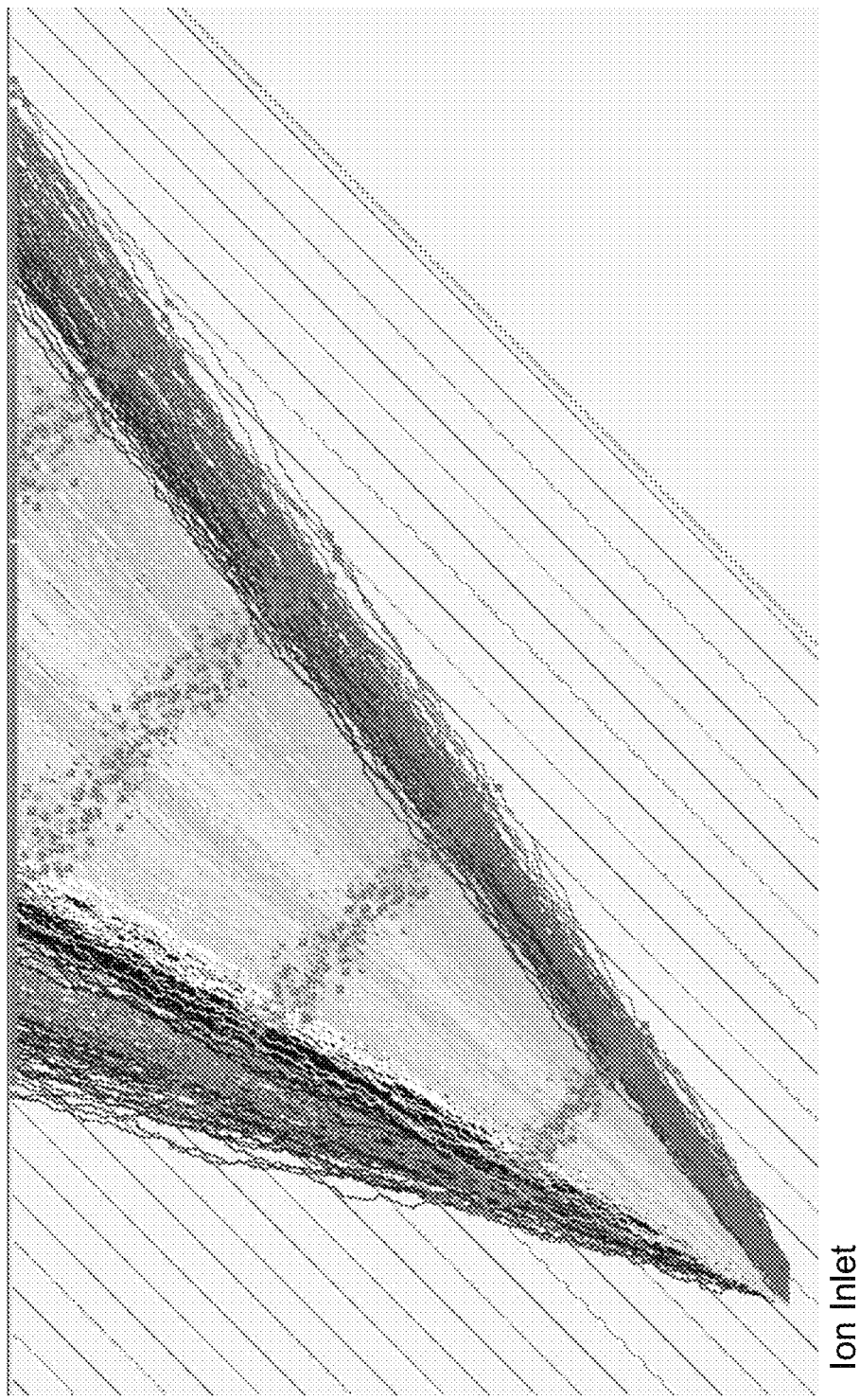

FIGS. 10A, 10B and 10C are illustrations of ion simulations within an exemplary ion mobility separator.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for ion separation are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Mass Spectrometry Platforms

Figure 1:
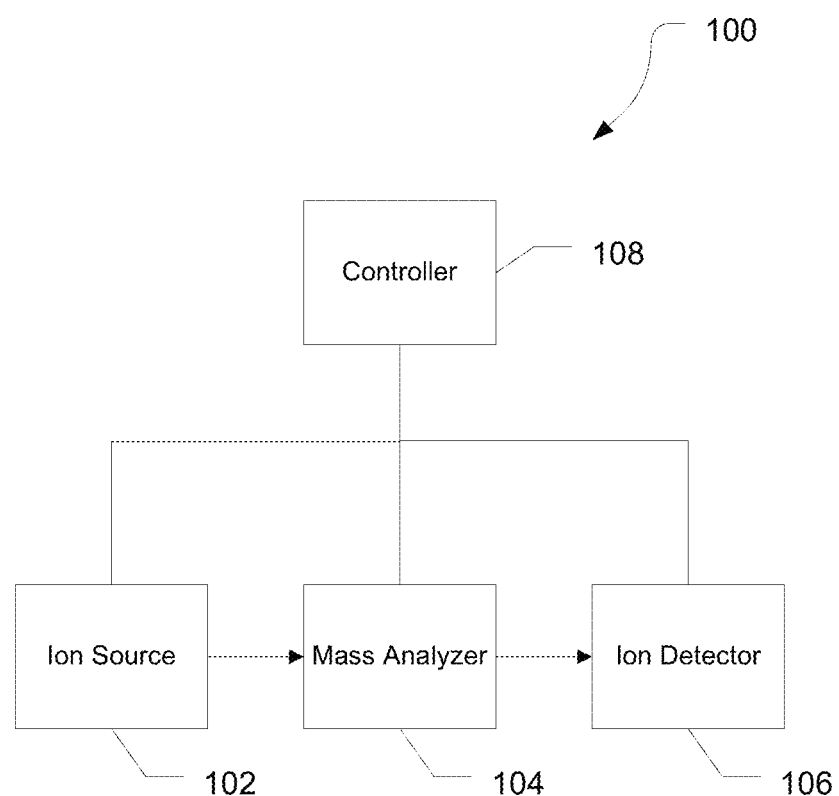
FIG. 1 is a block diagram of an exemplary mass spectrometry system, in accordance with various embodiments.

Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, a mass analyzer 104, an ion detector 106, and a controller 108.

In various embodiments, the ion source 102 generates a plurality of ions from a sample. The ion source can include, but is not limited to, a matrix assisted laser desorption/ionization (MALDI) source, electrospray ionization (ESI) source, atmospheric pressure chemical ionization (APCI) source, atmospheric pressure photoionization source (APPI), inductively coupled plasma (ICP) source, electron ionization source, chemical ionization source, photoionization source, glow discharge ionization source, thermospray ionization source, and the like.

In various embodiments, the mass analyzer 104 can separate ions based on a mass-to-charge ratio of the ions. For example, the mass analyzer 104 can include a quadrupole mass filter analyzer, a quadrupole ion trap analyzer, a time-of-flight (TOF) analyzer, an electrostatic trap (e.g., Orbitrap) mass analyzer, Fourier transform ion cyclotron resonance (FT-ICR) mass analyzer, and the like. In various embodiments, the mass analyzer 104 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio.

In various embodiments, the ion detector 106 can detect ions. For example, the ion detector 106 can include an electron multiplier, a Faraday cup, and the like. Ions leaving the mass analyzer can be detected by the ion detector. In various embodiments, the ion detector can be quantitative, such that an accurate count of the ions can be determined.

In various embodiments, the controller 108 can communicate with the ion source 102, the mass analyzer 104, and the ion detector 106. For example, the controller 108 can configure the ion source or enable/disable the ion source. Additionally, the controller 108 can configure the mass analyzer 104 to select a particular mass range to detect. Further, the controller 108 can adjust the sensitivity of the ion detector 106, such as by adjusting the gain. Additionally, the controller 108 can adjust the polarity of the ion detector 106 based on the polarity of the ions being detected. For example, the ion detector 106 can be configured to detect positive ions or be configured to detected negative ions.

Low Pressure Ion Mobility Separation

Figure 2:
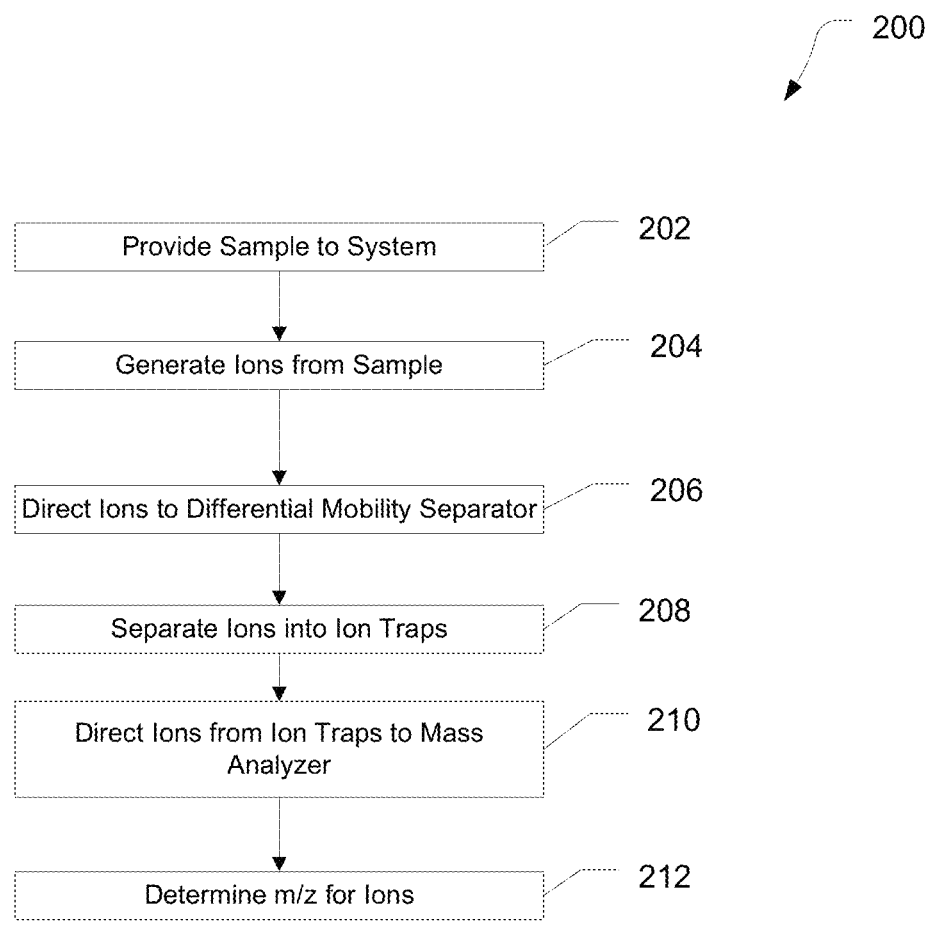
FIG. 2 is a flow diagram of an exemplary method for separating ions, in accordance with various embodiments.

FIG. 2 is a flow diagram illustrating an exemplary method 200 of separating ions according to their mobility in order to increase the efficiency of a mass spectrometry platform, such as mass spectrometry platform 100 in FIG. 1.

At 202, a sample can be provided to a system. In various embodiments, the sample can be effluent from a liquid chromatography column, effluent from a gas chromatography column, a directly injected sample (liquid or gas), or a sample embedded in a solid matrix.

At 204, they system can generate ions from the sample. The sample can enter into an ion source to generate ions. The ion source can utilize various energy sources, such as electrical, light, plasma, chemical, electrons, heat, or the like to ionize the sample or components of the sample.

At 206, the ions can move from the source into a mobility separator. In various embodiments, the mobility separator can include a flow of gas in a first direction and an electrical field in a second direction. In various embodiments, the ions can move with a substantially similar velocity in the first direction due to the flow of the gas. However, the velocity in the second direction can be affected by collisions with the gas ions, and thus larger ions (with a greater collisional cross section) will move more slowly in the second direction, resulting in a separation of the ions along the first direction being a function of transit time in the second direction. That is, larger ions that move more slowly in the second direction will move further in the first direction in the time it takes for them to traverse the mobility separator in the second direction, while smaller ions will move faster across the mobility separator, and thus the distance traveled will be smaller. In this way, ions entering an ion channel can have a different range on ion mobilities to ions entering an adjacent ion channel.

At 208, the ions can be separated and delivered into a plurality of ion channels arranged along the first direction of the mobility separator. Smaller ions can enter an ion channel located a smaller distance along the first direction relative to the ion entrance, while larger ions can enter an ion channel located a larger distance along the first direction relative to the ion entrance. As ions enter the mobility separator, the can be accumulated in the ion channels based on their ion mobility.

In various embodiments, the ion channels can include ion traps, RF ion guides, DC ion lenses, or a combination thereof. In particular embodiments, the ion channels can include ion traps each defined by a plurality of rods. Additionally, each ion trap can include one or more drag vanes. In certain embodiments, adjacent ion traps in the array of ion traps can share a pair of rods.

At 210, ions can be ejected from one of the ion channels/traps and sent to a mass analyzer. In alternate embodiments, the ions may undergo other processes prior to reaching the mass analyzer, such as separations based on mass-to-charge ratio, fragmentations, or the like. In various embodiments, the ions of other mobility can continue to be accumulated in their respective traps. Additionally, the ions can be sequentially ejected from a plurality of the ion channels/traps, so that the ions can be analyzed.

At 212, the mass analyzer can determine the mass-to-charge ratio of the ions, or the fragments of the ions if the ions undergo fragmentation prior to the mass analyzer.

Figure 3:
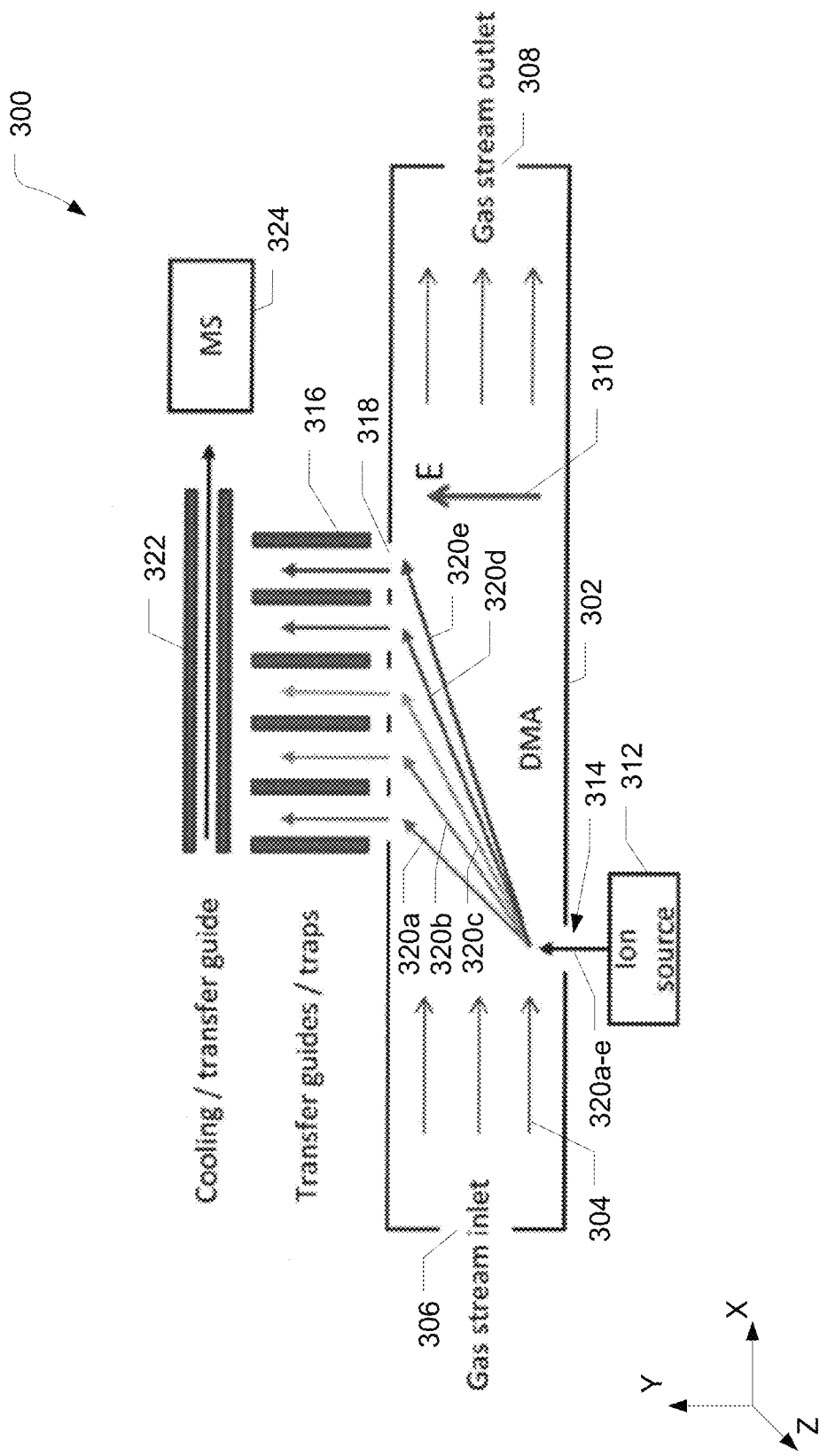
FIG. 3 is a block diagram illustrating an exemplary ion mobility separator, in accordance with various embodiments.

FIG. 3 is a block diagram illustrating a mobility separator 300. The mobility separator 300 can include a mobility cell 302 consisting of a region, such as a substantially rectangular region, with a gas flow 304 moving in a first direction from a gas inlet 306 at one end to a gas outlet 308 at the opposite end. Additionally, an electrical field gradient 310 can be applied in a second direction. In various embodiments, the first direction and the second direction can form an angle of between about 45° and 180°, such as between about 70° and about 150°. In particular embodiments, the first direction and the second direction can be orthogonal (at right angles, perpendicular) to one another.

In various embodiments, a gas pressure within the mobility cell 302 can be between about 1 Torr and about 20 Torr, such as between about 3 Torr and about 6 Torr. In various embodiments, the gas flow can be between about 5 slm and about 50 slm. In various embodiments, the average gas velocity within the mobility analyzer cell 302 can be between about 50 m/s and about 250 m/s, such as between about 100 m/s and about 200 m/s.

An ion source 312 can be located proximal to an ion entrance 314 and an array of ion channels 316 can be located proximal to an array of ion exit orifices 318. The ion exit orifices 318 can be located opposite the ion entrance 314 in the second direction, and can be offset from the ion entrance 314 and spaced apart from one another in the first direction. Ions 320a through 320e entering the mobility cell 302 from the ion source 312 can be separated into the ion exit orifices 318 and directed into the array of ion channels 316 in accordance with their ion mobility within the mobility cell 302. In various embodiments, the ions 320a through 320e can flow at a substantially the same velocity along the first direction and may move in the second direction according to their collisional cross section. Thus, ions 320e with a larger collisional cross section can move more slowly in the second direction due to a larger number of collisions with the molecules in the gas flow relative to ions with a smaller collisional cross section 320a. Due to the slower movement in the second direction, ions 320e can move further along the first direction during their transit across the mobility cell 302. In this way, ions with successively larger collisional cross section can be sorted into the array of ion channels 316, such that ions in an ion channel have a different range of ion mobilities from ions in an adjacent ion channel.

In various embodiments, a lens array (not shown) can be positioned between the ion exit orifices 318 and the ion channels 316. The lens array can be configured to guide ions into the respective channel, such as by focusing the ions towards the centerline of the channel.

In various embodiments, the plurality of ion channels 316 can include between about 3 ion channels and about 50 ion channels, such as between about 5 ion channels and about 20 ion channels, even between about 7 ion channels and about 15 ions traps.

A cooling/transfer guide 322 can be located adjacent to the plurality of ion channels 316. Ions can be ejected from one of the ion channels 316 into the cooling/transfer guide 322. From the cooling/transfer guide 322, the ions can be directed to a mass analyzer 324. In various embodiments, the ions may be directed to other processes, such as a fragmentation cell (not shown), prior to the mass analyzer.

In various embodiments, the mobility separator system 300 can separate ions spatially to allow only one or a few types of ions to be directed to the mass analyzer at a time while capturing multiple groups of ions that can be stored in traps and subsequently injected into the mass analyzer. The ejections from the ion channels 316 can allow the mass analyzer to perform mass analysis of an ion packet while other ions continue to be accumulated and stored in the ion traps 316. The potential gain provided by the mobility separator can be equal to the number of separate channels.

Figure 4:
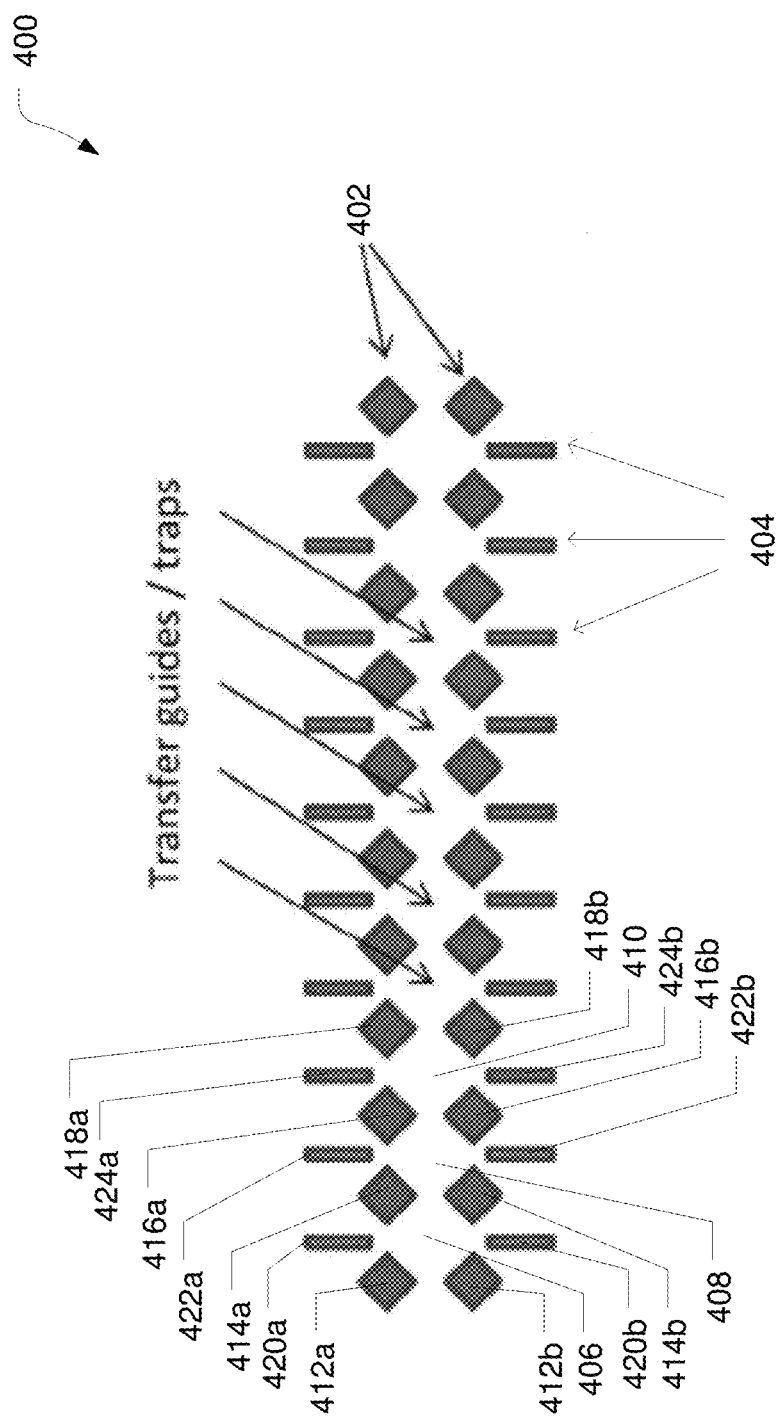
FIG. 4 is a block diagram illustrating an exemplary array of ion channels, in accordance with various embodiments.

FIG. 4 is a block diagram illustrating an exemplary array of ion channels 400, such as the array of ion channels 316 in FIG. 3. In various embodiments, the array of ion channels 400 can include an array of quadrupole rod pairs 402 and an array of drag vane pairs 404. Each ion channel, such as ion channels 406, 408, and 410, can be defined by 4 quadrupole rods (2 pairs). For example, ion channel 406 is defined by quadrupole rods 412a, 412b, 414a, and 414b, ion channel 408 is defined by quadrupole rods 414a, 414b, 416a, and 416b, and ion channel 410 is defined by quadrupole rods 416a, 416b, 418a, and 418b. Additionally, adjacent ion channels can share a quadrupole rod pair between them, for example, ion channels 406 and 408 share quadrupole rods 414a and 414b, and ion channels 408 and 410 share quadrupole rods 416a and 416b. The quadrupole rods can create a quadrupolar field in each ion channel to confine ions within the channel.

Additional stopping DC voltages can be applied to the optical element before and after the set of quadrupole rods to trap ions inside the channels which in this case operate as ion traps. When needed, these voltages can be lowered quickly to release ions from the channels.

Additionally, in order to ensure quick release ions only from specific channels, each ion channel can include a corresponding pair of drag vanes. For example, ion channel 406 can have include drag vanes 420a and 420b, ion channel 408 can have include drag vanes 422a and 422b, and ion channel 410 can have include drag vanes 424a and 424b. By placing a DC gradient along a pair of drag vanes, ions can be driven out of the channel, such as into the cooling/transfer guide 322 of FIG. 3. Additional, as each ion channel has a unique pair of drag vanes, ions can be driven from one ion channel without driving ions from an adjacent ion channel.

FIGS. 5A through 5C show electrode arrangements for establishing the electric field gradient along the second direction of the mobility cell, such as mobility cell 302 in FIG. 3. FIG. 5A illustrates the use of a set of discrete electrodes (502a through 502h) on the walls of the mobility analyzer cell. The discrete electrodes can have increasing DC potentials going from $V_0$ proximal to the ion entrance to $V_N$ proximal to the ion exit. Additionally, in various embodiments, the discrete electrodes can be configured to establish a non-uniform electric field gradient, such that the electric field gradient systematically varies. Such an electric field gradient can partially confine and focus ions towards the centerline to compensate for diffusion broadening.

FIG. 5B illustrates the use of a resistive layer 504 to generate a continuous potential distribution from $V_0$ proximal to the ion entrance to $V_N$ proximal to the ion exit. Resistive layer 504 can be used to establish a substantially uniform electric field gradient.

FIG. 5C illustrates a set of discrete electrodes (506a through 506h) on the walls of the mobility cell, with the discrete electrodes configured with alternating RF potentials to confine ions towards the center and increasing DC potentials going from $V_0$ proximal to the ion entrance to $V_N$ proximal to the ion exit.

FIG. 6A illustrates an alternative approach to generating DC field inside mobility cell 600. In this case, the side panels can be made of insulating PCB material while contacts (pads) 602 can be formed by metal deposition. In various embodiments, the contacts can be rectangular or have other regular polyhedron that can form a tessellation of the space, such as hexagonal. Contacts can be addressed individually from the opposite side of the PCB providing separate DC voltages for each contact. By independently controlling the DC voltages for each contact, a variety of field distributions can be constructed. Additionally, the field distribution can be changed dynamically without changes to the hardware.

FIG. 6B illustrates an exemplary field distribution that can be approximated by applying voltages to metal pads is shown in FIG. 6A. This configuration can create a variable angle of field gradients inside the device as indicated arrows 620a through 620h. Target ions that travel from the inlet 622 to one of the outlets 624a through 624i can generally stay within the region between arrows 626 and 628. Within the region, the ions can pass through a range of angles between the field gradient and the gas flow, such as ranging from about 180° near the inlet 622 to about 90° near the outlets 624a through 624i. Having angle larger than 90° can increase the ion residence in the DMA cell and can improve the separation efficiency. Additionally, the entire exit plane can be at one DC potential so no segmentation of the exit plane is required. All exit ion guides can be at the same potential as well so handling of ions coming from different channels into the mass spectrometer can be simplified.

In various embodiments, the field distribution of FIG. 6B can be produced by other electrode arrangements, such as a series of curved electrodes with a layout roughly corresponding to the field lines shown in the FIG. 6B. Such an arrangement may have fewer voltages to control, and may even be constructed using resistive coupling of the electrodes such that only one voltage controller is required rather than a large number of independently controlled electrodes as in the case of the grid. However, such an arrangement would be fairly static in configuration with less customization and adjustment than would be available using the independently controllable contacts shown in FIG. 6A.

Figure 7A:
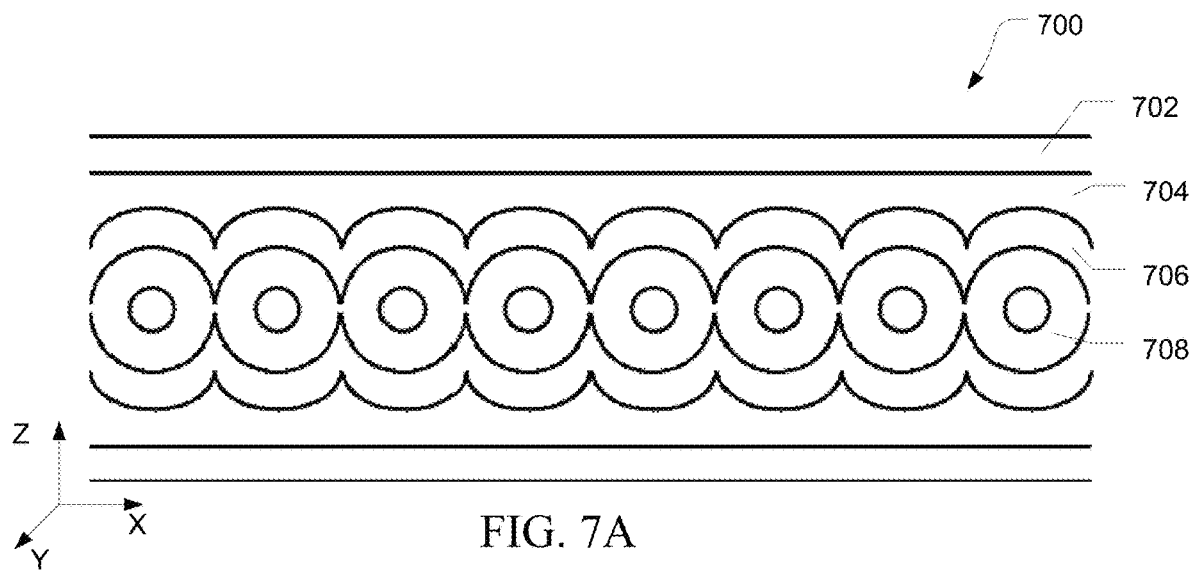
Figure 7B:
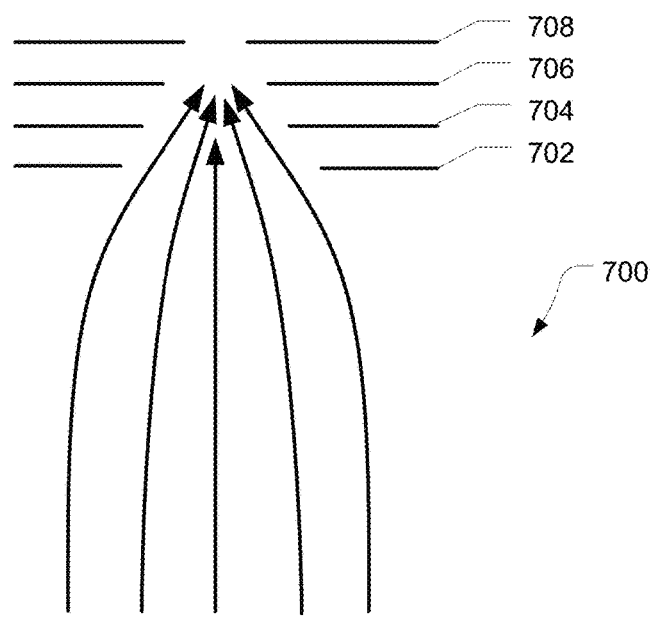

FIGS. 7A and 7B show an ion optical arrangements for focusing ions into the exit orifices of the ion mobility separator. A set of electrodes with diminishing dimensions can be provided ending with the final electrode containing the orifice. The stepped surface can be designed to be as smooth as possible to provide minimal impact on the gas dynamics. FIG. 7A shows an exemplary electrode geometry as seen from the direction of the ion motion. Electrodes 702, 704, 706, and 708 can have openings with decreasing size from the outermost elect 702 to innermost electrode 708. FIG. 7B shows the electrodes from a different angle and illustrates the ion path. Voltages applied can be DC or RF or the combination thereof which can both focus the ions toward the center line and provide a drag force to move them towards the exit hole. In particular embodiments, electrode 702 and 708 can carry DC only voltages and middle electrodes 704 and 706 can have RF potentials of alternating polarity. This arrangement can be particularly efficient in avoiding losses at the ion exit, thereby increasing ion transmission.

Figure 7C:
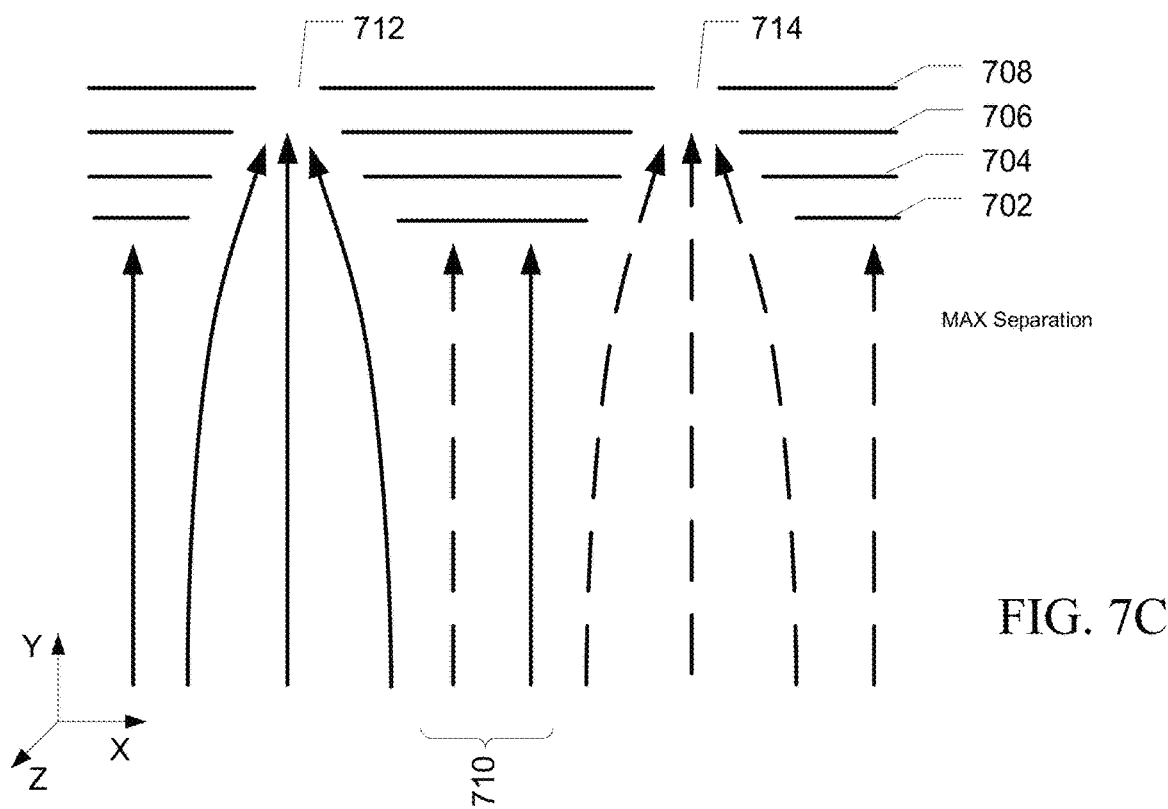
Figure 7D:
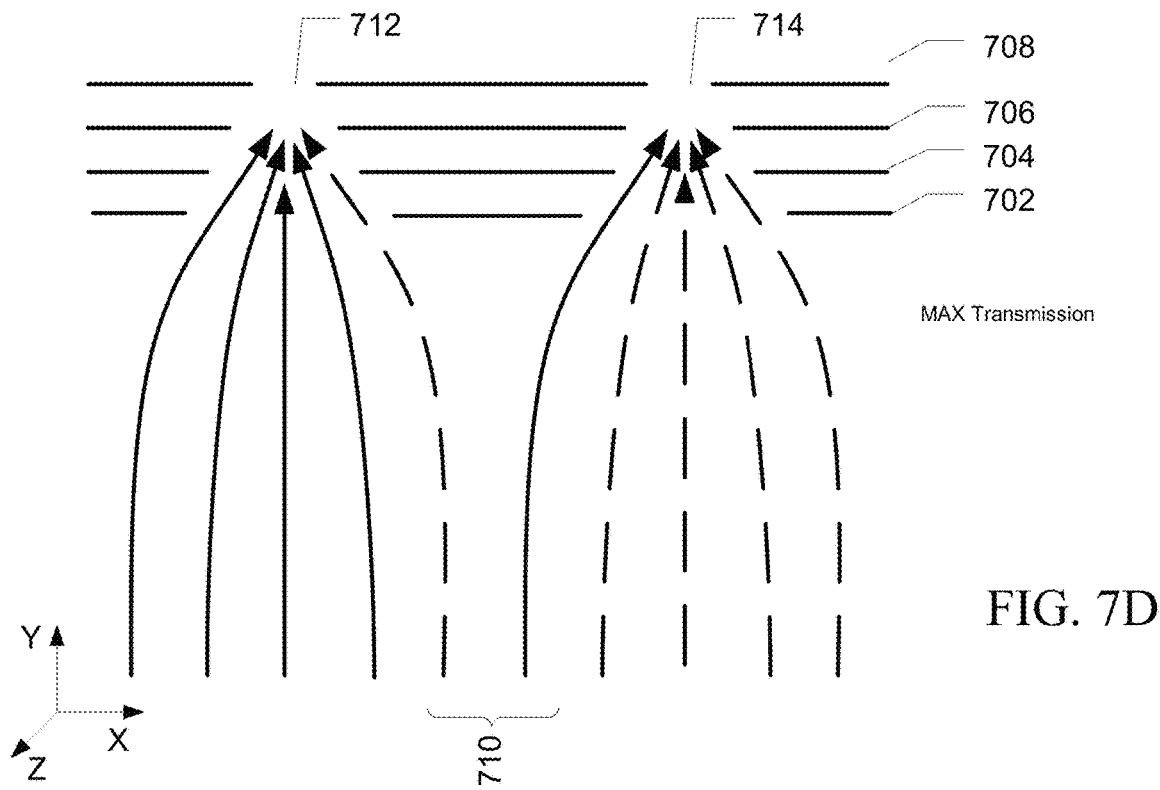

FIGS. 7C and 7D show various configurations of the ion optical arrangement of FIGS. 7A and 7B. The region 710 between the exit orifices 712 and 714 may have overlap in the range of ion mobilities. That is region 710 may include ions with ion mobilities corresponding to the range of ion mobilities targeted to exit orifice 712 and ions with mobilities corresponding to the range of ion mobilities targeted to exit orifice 714.

In FIG. 7C, the ion optical arrangement can be configured to maximize separation between the ions exiting adjacent exit orifices. By reducing the focusing, the ions in the region of overlapping ion mobilities can be excluded from exit orifice 712 and 714, minimizing the ions exiting the exit orifice 712 that correspond to the ion mobility range of exit orifice 714 and the ions exiting exit orifice 714 that correspond to the ion mobility range of exit orifice 712.

In FIG. 7D, the ion optical arrangement can be configured to maximize ion transmission. By increasing the focusing, the ions in the region of overlapping ion mobilities can be directed to one of exit orifice 712 or 714, minimizing the ions lost to collisions with electrode 702. However, there this configuration may increase the number of ions exiting the exit orifice 712 that are outside the range of ion mobilities targeted to exit orifice 712 the number of ions exiting the exit orifice 714 that are outside the range of ion mobilities targeted to exit orifice 714.

FIG. 8 illustrates a method 800 of separating ions according to their mobility in order to increase the efficiency of a mass spectrometry platform, such as mass spectrometry platform 100 in FIG. 1. At 802, a sample can be provided to a system. In various embodiments, the sample can be effluent from a liquid chromatography column, effluent from a gas chromatography column, a directly injected sample (liquid or gas), or a sample embedded in a solid matrix.

At 804, they system can generate ions from the sample. The sample can enter into an ion source to generate ions. The ion source can utilize various energy sources, such as electrical, light, plasma, chemical, electrons, heat, or the like to ionize the sample or components of the sample.

At 806, the ions can move from the source into a mobility separator. In various embodiments, the mobility separator can include a flow of gas in a first direction and an electrical field in a second direction. In various embodiments, the ions can move with a substantially similar velocity in the first direction due to the flow of the gas. However, the velocity in the second direction can be affected by collisions with the gas ions, and thus larger ions (with a greater collisional cross section) will move more slowly in the second direction, resulting in a separation of the ions along the first direction being a function of transit time in the second direction. That is, larger ions that move more slowly in the second direction will move further in the first direction in the time it takes for them to traverse the mobility separator in the second direction, while smaller ions will move faster across the mobility separator, and thus the distance traveled will be smaller. In this way, ions entering an ion channel can have a different range on ion mobilities to ions entering an adjacent ion channel.

At 808, the ions can be separated and delivered into a plurality of ion channels arranged along the first direction of the mobility separator. Smaller ions can enter an ion channel located a smaller distance along the first direction relative to the ion entrance, while larger ions can enter an ion channel located a larger distance along the first direction relative to the ion entrance. As ions enter the mobility separator, the can be accumulated in the ion channels based on their ion mobility.

At 810, ions can be ejected from one of the ion channels/traps and sent to a mass analyzer. In alternate embodiments, the ions may undergo other processes prior to reaching the mass analyzer, such as separations based on mass-to-charge ratio, fragmentations, or the like. In various embodiments, the ions of other mobility can continue to be accumulated in their respective traps. Additionally, the ions can be sequentially ejected from a plurality of the ion channels/traps, so that the ions can be analyzed.

At 812, operating parameters of the mobility separator can be changed. In various embodiments, the voltages and/or arrangement of the field gradient can be altered by changing the voltages on the gradient electrodes or contact pads. This can increase or decrease the dwell time in the separator altering the range of ion mobilities that are targeted to each exit orifice. In other embodiments, the voltages of the ion optics at the exit orifices can be changed to increase separation or increase transmission. In some cases, both may be changed simultaneously. After the parameters are changed, additional ions can be directed to the mobility separator, as indicated at 806.

At 814, the mass analyzer can determine the mass-to-charge ratio of the ions, or the fragments of the ions if the ions undergo fragmentation prior to the mass analyzer.

In various embodiments, the voltages or voltage patterns of the ion mobility separator can be changed dynamically during a chromatographic separation. For example, the mobility separator can be configured to a narrow range of ion mobilities for one chromatographic region (retention time range) and a broad range of ion mobilities for a second chromatographic region. In another example, the ion mobility separator can alternate between a narrow range of ion mobilities at a first mass range and a broad range of ion mobilities at a second mass range within the same chromatographic region.

In various embodiments, a survey can be performed where a broad range of ion mobilities are separated in the mobility separator with the ion optics configured to maximize separation. Upon detecting ions of interest, the mobility separator can be reconfigured to narrow the range of ion mobilities to obtain more detailed analysis of ions within the region. A corresponding change to increase the transmission of ions through the ion optics may be desirable as the narrower range may contain fewer ions targeted to each ion exit and there may be fewer overlapping ions. Due to the timescale of the chromatographic separation and the time it takes to perform a survey, the instrument can be configured to perform the survey periodically during a chromatographic separation, switching to the more detailed analysis upon detecting the presence of a target ion or upon detection in an increase in ion intensity. The system can be configured to perform a more detailed analysis for specific list of target ions at specific retention times (data independent analysis) or when as ion species are detected (data dependent analysis).

FIGS. 9A and 9B illustrate configurations for bypassing the ion mobility separator. For example, tuning upstream and downstream elements of the mass spectrometer can be simplified when not utilizing the ion mobility separation. In FIG. 9A, ion mobility separator 902 can include an additional ion exit aperture 904 positioned across from the ion entrance 906. In various embodiments, the gas flow may be stopped and ions can cross the ion mobility separator 902 directly from ion entrance 906 to ion exit aperture 904.

In FIG. 9B, an alternate ion path 910 can be provided that completely bypasses the ion mobility separator 912. A branch point 914 can be located upstream of the ion mobility separator 912 and the alternate path 910 can rejoin the ion paths through the ion mobility separator 912 at a downstream point 916.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

Simulation Results

FIG. 10A shows results of a SIMION simulation of a 9-channel DMA ion mobility separator. Parameters are shown in Table 1. Separation of three different mass ions are simulated including m1 has a mass of 300 Da and a collisional cross section of 1 nm$^2$, m2 has a mass of 600 Da and a collisional cross section of 1.6 nm$^2$, and m3 has a mass of 1000 Da and a collisional cross section of 2.4 nm$^2$. The simulation shows the ions are separated into different ion channels, with the m1 ions entering the first ion channel, the m3 ions entering the last ion channel, and the m2 ions being split between the fourth and fifth ion channels.

FIG. 10B shows results of a SIMION simulation of a 9-channel DMA ion mobility separator. Separation of three different mass ions are simulated including m1 has a mass of 300 Da and a collisional cross section of 1.2 nm$^2$, m2 has a mass of 350 Da and a collisional cross section of 1.3 nm$^2$, and m3 has a mass of 400 Da and a collisional cross section of 1.4 nm$^2$. The simulation shows the ions are separated into different ion channels, with the m1 ions entering the fourth ion channel, the m2 ions being entering the fifth ion channel, and the m3 ions entering the sixth ion channel. The separation at higher pressure achieves better resolution and separation of ions with smaller differences in mobility cross-section.

FIG. 10C shows results of a SIMION simulation of a multi-channel DMA ion mobility separator where the field gradient angled at 135 degrees to the direction of the gas flow. Separation of ions having a range of mass-to-charge ratios between 200 and 500 and a range of collisional cross sections between 0.73 and 1.4 nm$^2$ are simulated. The simulation shows the ions are separated along the length of the DMA ion mobility separator. Due to the field gradient at 135 the separation length can be made substantially longer for a set of ions with a narrower range of cross sections thus improving the resolution.

TABLE 1

| Parameter | FIG. 10A | FIG. 10B | FIG. 10C |
|---|---|---|---|
| Ion separator dimensions | 40 mm × 50 mm × 10 mm | 40 mm × 50 mm × 10 mm | 40 mm × 50 mm × 10 mm |
| Pressure | 3 Torr Nitrogen | 6 Torr Nitrogen | 3.2 Torr Nitrogen |
| Gas Flow | 17 slm | 17 slm | 17 slm |
| Gas Velocity | 180 m/s | 180 m/s | 180 m/s |
| Electric Field | 250 V | 400 V | 150 V |
| Outlet Array Width | 30 mm | 30 mm | 30 mm |
| Separation Resolution | >10 | >15 | ≈20 |
| Separation Time | 300 μsec | 300 μsec | 400 μsec |

What is claimed is:

1. An ion mobility device for separating ions based on their ion mobility, comprising:
    an ion mobility cell having a gas inlet and a gas outlet opposite the inlet along a first direction such that a gas flow introduced at the gas inlet would flow in a first direction to the gas outlet, an ion entrance and a plurality of ion exit apertures opposite the ion entrance along a second direction and offset from the ion entrance and spaced apart from one another along the first direction;
    a plurality of electrodes configured to generate an electric field gradient in the second direction such that ions entering the ion mobility cell flow in the first direction with the gas and drift according to their mobility in the gas in the second direction such that ions exiting an ion exit aperture have a range of ion mobilities that is different from a range of ion mobilities for ions entering an adjacent ion exit aperture; and
    a lens array positioned adjacent to plurality of ion exit apertures and configured to guide ions into respective ion exit apertures, the lens array includes at least one electrode with a plurality of openings aligned with the ion exit apertures, wherein an opening size of the electrode is greater than an opening size of the ion exit apertures.

2. The ion mobility device of claim 1, wherein an angle between an electric field gradient and the gas flow differs depending on the location within the passage.

3. The ion mobility device of claim 1, where in the at least one electrode includes an outer electrode, and at least one additional electrode located between the outer electrode and the plurality of ion exit apertures, wherein the opening size of the electrodes increases from the plurality of ion exit apertures to the outer electrode.

4. The system of claim 1, wherein the DC and RF potentials on lens array electrodes are configured to maximize transmission of ions.

5. The system of claim 1, wherein the DC and RF potentials on lens array electrodes are configured to maximize separation between ranges of ion mobilities.

6. A method for identifying components of a sample comprising:
providing a sample to an ion source and generating a plurality of ions from constituent components of the sample;
separating a first set of ions of the plurality of ions based on ion mobility using a ion mobility separator having a gas flow in a first direction and an electric field such that ion paths of the ions of the first set from a ion entrance to a plurality of ion exit apertures are governed by the electric field and the gas flow;
directing the ions into a plurality of ion channels using a lens array such that ions entering an individual ion channel have a range of ion mobilities that is different from a range of ion mobilities for ions entering an adjacent ion channel, the lens array having a first set of potentials;
directing ions from individual ion channels into a mass analyzer;
changing the lens array to a second set of potentials;
separating a second set of ions of the plurality of ions based on ion mobility using the mobility separator;
directing the ions into the plurality of ion channels using lens array with the second set of potentials;
directing ions from individual ion channels into a mass analyzer; and
determining the mass-to-charge ratio of the first and second sets of ions using the mass analyzer,
wherein the lens array includes an outer electrode and at least one additional electrode between the plurality of ion channels and the outer electrode, wherein the electrodes have openings therein, and wherein an opening size of the electrodes increases with a distance from the plurality of ion channels.

7. The method of claim 6, wherein the lens array includes at least one electrode with a plurality of openings aligned with the ion exit apertures.

8. The method of claim 6, wherein a transmission of the first set of ions with the first set of potentials is greater than a transmission of the second set of ions with the second set of potentials.

9. The method of claim 6, wherein a separation of the first set of ions with the first set of potentials is greater than a separation of the second set of ions with the second set of potentials.

* * * * *

UNITED STATES PATENT AND TRADEMARK OFFICE
CERTIFICATE OF CORRECTION

PATENT NO. : 11,119,070 B2
APPLICATION NO. : 16/878205
DATED : September 14, 2021
INVENTOR(S) : Mikhail V. Ugarov It is certified that error appears in the above-identified patent and that said Letters Patent is hereby corrected as shown below:

In the Claims

Claim 4, Column 15, Line 14:
Replace "The system of claim 1"
With --The ion mobility device of claim 1--

Claim 5, Column 15, Line 17:
Replace "The system of claim 1"
With --The ion mobility device of claim 1--

Claim 6, Column 15, Line 26:
Replace "using a ion mobility separator"
With --using an ion mobility separator--

Claim 6, Column 15, Line 28:
Replace "from a ion"
With --from an ion--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*